United States Patent [19]

Redmond

[11] 4,246,753
[45] Jan. 27, 1981

[54] ENERGY SALVAGING SYSTEM

[76] Inventor: Benjamin Redmond, 520 E. 77th St., New York, N.Y. 10021

[21] Appl. No.: 88,085

[22] Filed: Oct. 24, 1979

[51] Int. Cl.³ ............................................. F16D 31/02
[52] U.S. Cl. ................................ 60/398; 60/DIG. 2; 290/43; 415/116
[58] Field of Search ................. 60/639, 325, 327, 398, 60/DIG. 2; 290/43, 54; 417/900; 415/116, 121 R, 121 A, 92

[56] References Cited

U.S. PATENT DOCUMENTS

| | | | |
|---|---|---|---|
| 2,372,538 | 3/1945 | White | 415/121 R |
| 2,436,683 | 2/1948 | Wood | 290/43 |
| 3,434,654 | 3/1969 | Feller | 415/116 |
| 3,796,509 | 3/1974 | Wood | 415/116 |

FOREIGN PATENT DOCUMENTS

| | | | |
|---|---|---|---|
| 610058 | 3/1979 | Switzerland | 415/92 |
| 2732552 | 2/1979 | Fed. Rep. of Germany | 290/54 |

*Primary Examiner*—Allen M. Ostrager
*Assistant Examiner*—Stephen F. Husar
*Attorney, Agent, or Firm*—Paul J. Sutton

[57] ABSTRACT

A drainpipe or sewer system gravitationally conducting wet sewage for discharge into a community sewer system having a section of said drainpipe, preferably between the last feeder pipe and the discharge end of said drainpipe into the community sewer system, containing therein a means supported by and or integrated with a rotatable shaft projecting through and beyond the wall of said drainpipe, positioned to intercept the moving sewage, in a manner to cause said means and shaft to rotate and permit the sewage to continue its flow into the community sewer system whereby said rotatable shaft becomes useable as a source of energy for various and sundry purposes.

4 Claims, 3 Drawing Figures

ENERGY SALVAGING SYSTEM

My invention, as will be more fully described below, deals with a subject that is on the minds of many of us—the conservation of energy! More particularly, it is a system to salvage existing kinetic energy which is presently being wasted.

It is an object of the present invention to provide a system for intercepting and utilizing gravitationally flowing wet or fluid sewage destined for a community sewage system to cause a combination of novel elements hereinbelow defined to extract therefrom kinetic energy to be utilized for desired needs or purposes.

Another object of my invention is to provide a system, as above, wherein the path of the wet or fluid sewage is not materially or ultimately altered, thereby avoiding safe and relatively efficient discharge thereof into the public sewage system.

Yet a further object of this invention is to provide the system, as above, whereby a shaft supported for rotation carries a central hub from which substantially radially extending vanes or impeller members of predetermined shape, size and cooperative configuration with respect to the drainpipe utilized, is caused to turn.

Still a further object of my invention is to provide a self-cleaning feature utilizing fluid or air jets disposed at predetermined locations.

In another preferred embodiment of my invention, I provide control means for initiating the aforesaid self-cleaning operation at times and durations that may be pre-established. This feature is not essential, however, for the operation of the system.

At this point within this specification, I wish to briefly discuss prior art of which I am aware, but which, whether taken singly or in any combination with one another, simply do not anticipate or suggest the present invention. More specifically, U.S. Pat. No. 4,142,367 granted on Mar. 6, 1979 to a Mr. Vito Guisti discloses a domestic water pressure-flow powered generating system which utilizes a bank of storage batteries to which a rotary electrical generator is hooked up. Emphasized within the specification of this patent is the use of the system with a domestic fresh water system, as opposed to a sewage system, which realizes approximately 70 pounds per square inch of pressure, this pressure sometimes realizing 100 pounds per square inch. A sliding vane rotary motor is serially connected in the supply pipe of a domestic water system, as opposed to a drainpipe. In operation, each time water is drawn from the domestic water system, water is caused to pass through the supply pipe and thus operate the sliding vane fluid motor. No cleaning or servicing provisions are disclosed within U.S. Pat. No. 4,142,367.

U.S. Pat. No. 3,984,698 granted on Oct. 5, 1976 in the name of Mr. Jack J. Brewer discloses a waterwheel driven electrical generator where electrical energy is generated utilizing a waterwheel as the prime mover. A principal purpose of the invention which is the subject of this patent concerns the provision of a satisfactory hydroelectric system using river and stream flow where the fall of the water is only slight, as compared to the falls within mountainous areas. There is no suggestion within this patent of the utilization of rotary means of the type disclosed by the present invention in conjunction with a drainpipe, nor is there any suggestion or anticipation of the self-cleaning means taught by the present invention.

U.S. Pat. No. 1,963,354 granted on June 19, 1934 to a Clare H. Currie discloses a sewage stabilization apparatus and process for outfall sewers. The thrust of the Currie patent concerns sewage stabilization, or the re-oxygenating of sewage in collecting containers whereby an effort is made to prevent the sewage from becoming septic. This is done via aeration and/or re-oxygenation whereby compressed air which contains oxygen is introduced under pressure such that there will be little or no likelihood of producing destructive, noxious or poisonous gases.

U.S. Pat. No. 696,809 was granted quite a while ago—Apr. 1, 1902, to a Mr. Joseph C. Gelly. This patent discloses a hydraulic motor of the reciprocating type which is operated automatically without the intermediary of any distributing mechanism. A purpose of the Gelly invention is to provide an apparatus construction which is extremely simple and adapted for erection in either a vertical, horizontal or inclined position. It should be obvious to the reader from this description and from a careful reading of each of these prior art patents, together with each and all references cited in each, that none of these patents discloses a sewage energy salvaging system according to the present invention and which incorporates self-cleaning features.

The present invention provides a novel sewage energy salvaging system which will be more clearly understood from the following description of a specific embodiment of the invention, together with the accompanying drawings, wherein.

Figure 1:
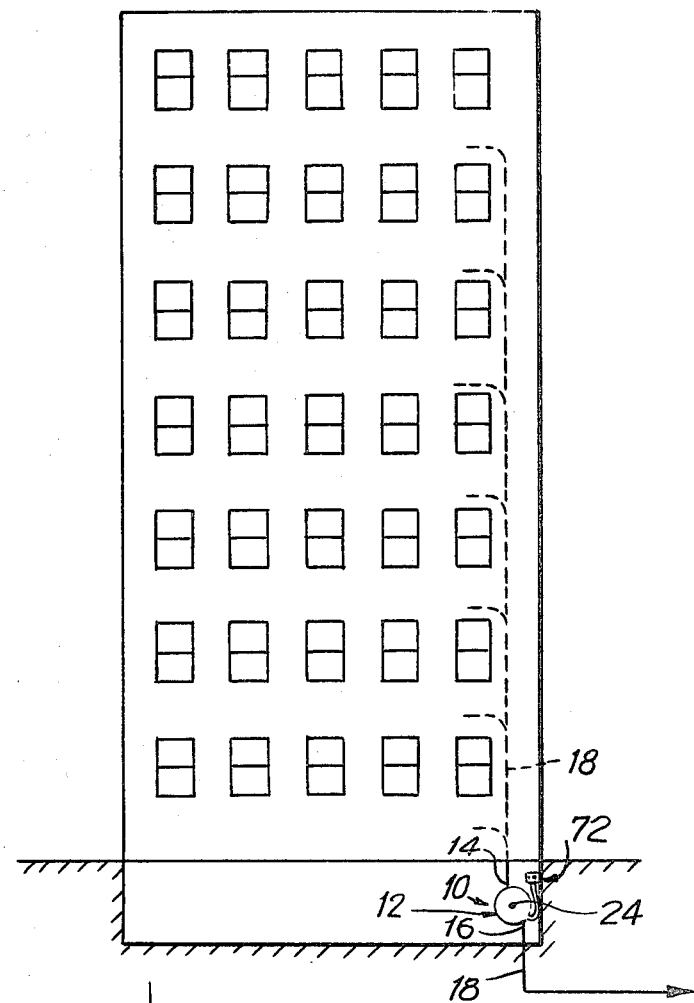
FIG. 1 is a schematic representative elevational view of an apartment buildin, as an example only, incorporating the present invention.
Figure 3:
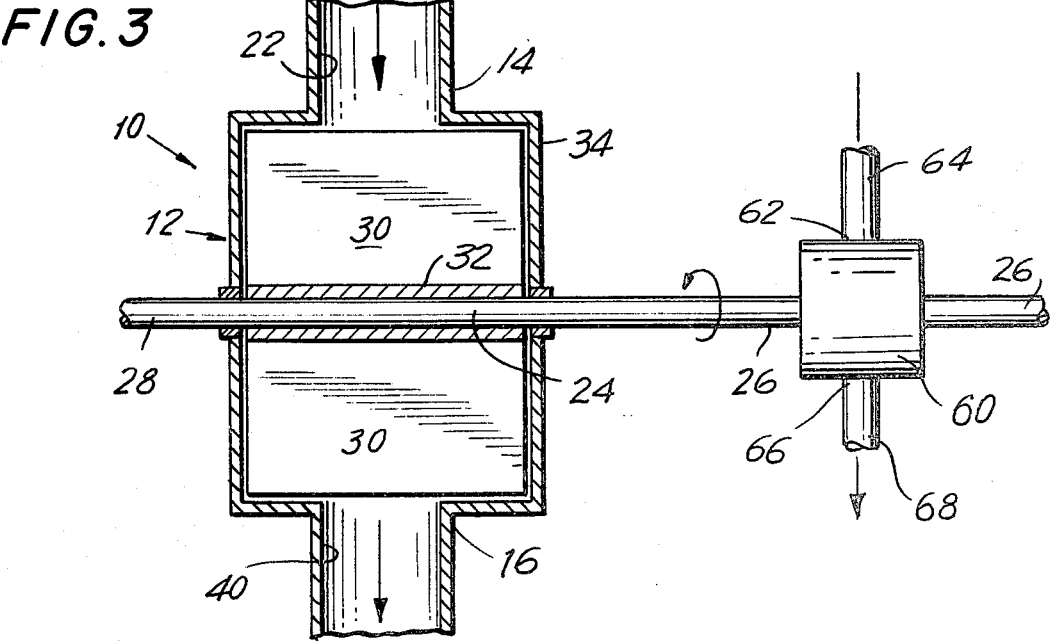
FIG. 3 is a fragmentary sectional elevational view taken along the line 3—3 of FIG. 2.
Figure 2:
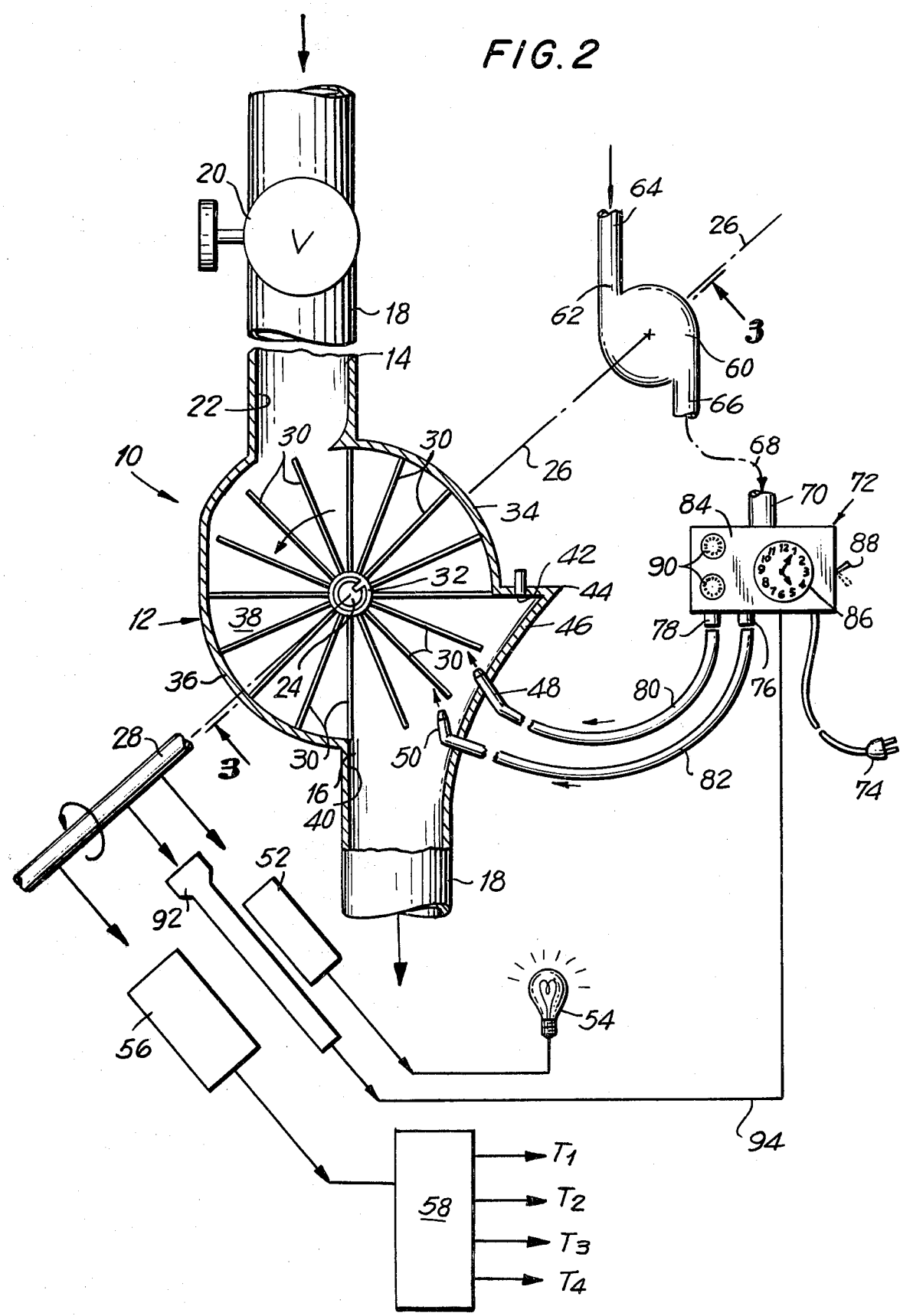
FIG. 2 is a partial fragmentary schematic sectional elevational view of a preferred embodiment of the system according to the present invention.

Referring specifically now to the drawing, a system 10 is shown to include a housing 12 having a unique configuration that extends from an entry point 14 to an exit point 16. System 10, according to the present invention, is connected utilizing conventional plumbing fittings or connectors in communicative cooperative line within a drainpipe 18 that is normally utilized to carry wet or fluid sewage from a point of entry (such as the exit of a sink) to and toward a public sewage system. In the drawing, it is seen that during the installation of the present invention, a drainpipe 18 is severed with a gap of predetermined size, a control valve 20 is installed upstream of the gap, assuming that there is no control valve already in existence, the system 10 and its housing 12 are connected in series with the drainpipe such that falling sewage under the influence of gravity will necessarily enter the confines of housing 12 through an entry port 22.

A substantially centrally located shaf. 24 is mounted or journalled for relatively friction-free rotation. Shaft 24 is shown to have extremeties 26 and 28 shown within the drawing in a schematic fashion as a shaft center line 26 on the right side of housing 12, and a fragmentary shaft 28 toward the left side.

A plurality of impellers or vanes 30 are mounted on a central hub 32 which, in turn, is keyed by conventional keying means to shaft 24 such that rotation of the hub will impart rotary movement to the shaft 24. While the present invention contemplates any number of vanes and impellers in order to operate in accordance with its intended function. I have chosen a 16-vane system for purposes of illustration.

Housing 12 includes a cross-sectional configuration shown in the drawing whereby two substantially cylindrical portions 34 and 36 define inner surfaces which provide a relatively fluid-type seal as between vanes 30 and the tips thereof and these interior surfaces. At the inlet side of housing 12, sewage entering interior chamber 38 within which vanes or impellers 30 rotate first impinges upon the three or four vanes lying between port 22 and chamber 38.

The sheer kinetic energy and weight of the falling sewage will impart counterclockwise rotational movement to vanes 30, thereby causing shaft 24 to rotate likewise in a counterclockwise direction. Thereafter, sewage is conveyed to and toward a discharge port 40 immediately before exit point 16, where the sewage falls away from the impellers or vanes 30 that are now approaching a horizontal disposition from a downwardly depending vertical disposition.

The bottom right quadrant of housing 12 is shown to include a configuration that differs somewhat from the remainder of this housing. A shoulder 42 is defined by an outward jutting of the housing to a point 44, whereby the housing configuration assumes a downward sloping side wall 46. Point 44 joins shoulder 42 and side wall 46.

A pair of jet nozzles 48 and 50 are supported by side wall 46 at an orientation which permits a discharge of fluid or air under pressure in the respective directions shown by the arrows within the drawing. Please note that at any given discharge time, the discharge direction of nozzles 48 and 50 will cause the jet discharged by them to hit or impinge upon different impellers or vanes 30. Fluid that has been discharged from jet nozzles 48 and 50, after hitting the vanes and loosening material clinging to the vanes or impellers 30 which have been in contact with the sewage, simply falls and exits through port 40 to drainpipe 18, thereby joining sewage that has passed through housing 12; excess air can escape through a valved vent in the housing wall or shoulder 42.

Thus, sewage passes through drainpipe 18, enters entry port 22 and impinges upon impellers or vanes 30, thereby causing shaft 24 to turn in a counterclockwise direction as shown in the drawing. The sewage is kept within housing 12 between vanes 30 until it reaches discharge port 40, where it exits through point 16 into drainpipe 18 on its path toward a public sewage system. The path of this sewage has been altered only slightly, and kinetic energy that has built as a result of the gravitational forces pulling the sewage downwardly through drainpipe 18 has been harnessed insofar as causing shaft 24 to turn.

Of course, the purpose of my invention is not to simply create a turning shaft 24. Shaft 24, now given this rotary motion, is able to do work, having itself acquired predetermined amounts of kinetic energy in the form of rotary energy. While only schematically shown and certainly not essential in order to accomplish the goals of my invention, it is contemplated that an extremity 28 of shaft 24 can via an electric generator 52 generate electricity in amounts suitable for lighting (see light bulb 54, for example). A more complex generating station 56 can be used to supply an electrical distribution station 58 with terminals T1, T2, T3 and T4 to which any number of appliances or other feeding lines may be attached.

I now wish to turn to the cleaning operation only touched upon in connection with my discussion of jet nozzles 48 and 50. A fluid pump 60 is shown cooperatively supported on extension 26 of shaft 24. Where desired, shaft extension 26 may be uncoupled or disconnected from shaft 24, thereby reducing friction when desired. However, in use, pump 60 includes an intake 62 which conducts water or any other suitable fluid from a conduit 64, such as a water supply pipe, to an outlet 66. Outlet 66 communicates by means of suitable conduit 68 with the intake 70 of a fluid control box 72.

Fluid control box 72 is preferably run by means of available household electricity supplied through a cord set 74, and serves to regulate water being fed from conduit 64 to jet nozzles 48 and 50.

I must stop here and re-emphasize that the provision of pump 60 and control box 72 is not necessary in order for my invention to function. In fact, one may simply use a simple on/off valve of any conventional type to regulate water being fed from conduit 64 to jet nozzles 48 and 50. However, in those instances where a busy superintendent or landlord does not wish to keep personnel on hand and wishes to utilize a self-cleaning system according to the present invention, I am providing a control box which takes fluid through intake 70 that has been pumped from conduit 64 in those instances where fluid within conduit 64 is not pressurized, with this same fluid being discharged out through outlets 76 and 78. Conduits 80 and 82 are coupled by suitable pipe joints to both control box 72 and jet nozzles 48 and 50 such that water that is regulated via fluid control box 72 is supplied under pressure to nozzles 48 and 50, when desired.

I wish to point out that according to the present invention, pump 60, which is only utilized intermittently or occasionally during circumstances that will be more fully described below, is actually driven by energy accumulated from falling sewage in rotating shaft 24. In other words, shaft 24, which has been caused to turn by means of the gravitationally falling sewage, in turn causes its extremety 26 to turn which, in turn, turns the internal impellers of pump 60, thereby enabling the pumping of fluid from conduit 64 toward and to fluid control box 72.

Fluid control box 72 is preferably of substantially rectangular configuration with a housing 84 in which a timer or clock 86 is supported. A toggle switch 88 is movable from the full-line position to that shown in phantom in order to control the power.

The setting of timer 86 is accomplished by means of control knobs 90 and in this way the user of system 10 is able to preset those times where it is desired to feed water through jet nozzles 48 and 50 to clean vanes 30. This supplying of water under pressure through jet nozzles 48 and 50 serves a dual purpose—namely, that of both cleaning and virtually assisting the counter-rotational travel of these vanes. Thus, should sewage for some reason clog or become stuck in conjunction with vanes 30 such that shaft 24 is either not rotating or rotating too slowly, an assist by means of pressurized water jets from jet nozzles 48 and 50, either in steady stream or in pulsating fashion, will both clean and assist the rotational movement of impellers or vanes 30.

Thus, periodic discharge of water from jets 48 and 50 is facilitated by means of fluid control box 72, and a sensing device 92 shown cooperatively but schematically hooked up to shaft 28 will sense both the presence of sewage above vanes 30 and a non-rotational condition of shaft 24 whereby this information is fed via conductor 94 to control box 72, whereby water is ejected through nozzles 48 and 50.

The embodiment of the invention particularly disclosed here is presented merely as an example of the invention. Other embodiments, forms, and modifications of the invention coming within the proper scope of the appended claims will, of course, readily suggest themselves to those skilled in the art.

What is claimed is:

1. An energy salvaging system for use in conjunction with buildings having non-pressurized drainpipes for gravitationally conducting wet and substantially non-homogeneous sewage including solids from one or more points of entry toward a discharge station into a public sewer system, or the like, comprising, in combination: rotatable means communicatively disposed within said drainpipe intermediate said entry points and said discharge station, for salvaging otherwise wasted kinetic energy associated with moving substantially non-homogeneous sewage including solids, said rotatable means comprising a housing, a shaft extending through said housing journalled for rotation within said housing, and a plurality of impellers integrated with said shaft and positioned to intercept the flowing sewage, said impellers being formed with impact surfaces normally contacted by the moving sewage at an impact location with a force sufficient to impart rotary movement to said integrated impellers and shaft, and cleaning means disposed at a position spaced from said impact location for forcibly directing a jet of cleaning matter at said impact surfaces at a time when they are facing the flow direction of the moving sewage, thereby causing a dislodging of solid sewage remaining on the impact surfaces after initial contact so as to utilize gravitational forces to draw the dislodged sewage toward the public sewer system, and accumulation means communicating with said shaft for storing useful potential energy generated from said kinetic energy.

2. An energy salvaging system, according to claim 1, wherein said means for cleaning comprises at least one jet nozzle capable of forceably discharging fluid.

3. An energy salvaging system according to claim 2, further comprising control means for operationally controlling the time and duration of said fluid means.

4. An energy salvaging system according to claim 1, wherein said accumulation means also includes a reservoir of compressed air.

* * * * *